United States Patent [19]

Furman, Jr.

[11] Patent Number: 5,187,219
[45] Date of Patent: Feb. 16, 1993

[54] WATER SOLUBLE POLYOLS IN COMBINATION WITH GLYOXLATED ACRYLAMIDE/DIALLYLDIMETHYL AMMONIUM CHLORIDE POLYMERS AS YANKEE DRYER ADHESIVE COMPOSITIONS

[75] Inventor: Gary S. Furman, Jr., St. Charles, Ill.

[73] Assignee: Nalco Chemical Company, Naperville, Ill.

[21] Appl. No.: 748,476

[22] Filed: Aug. 22, 1991

[51] Int. Cl.$^5$ .............................................. C08L 33/06
[52] U.S. Cl. .................................... 524/377; 524/386; 524/387; 162/112; 162/168.3; 264/282; 264/283
[58] Field of Search ....................... 524/386, 387, 377; 162/111, 112, 168.3; 264/282, 283

[56] References Cited

U.S. PATENT DOCUMENTS

| | | | |
|---|---|---|---|
| 3,556,932 | 1/1971 | Coscia et al. | 524/423 |
| 3,817,891 | 6/1974 | Keas | 524/386 |
| 3,839,500 | 10/1974 | Dexter | 524/377 |
| 3,926,716 | 12/1975 | Bates . | |
| 4,217,425 | 8/1980 | Ballweber et al. | 162/168.3 |
| 4,305,625 | 12/1981 | Grube et al. . | |
| 4,448,638 | 5/1984 | Klowak . | |
| 4,501,640 | 2/1985 | Soerens . | |
| 4,684,439 | 8/1987 | Soerens | 264/282 |

OTHER PUBLICATIONS

Federal Register, vol. 34, No. 118–Friday, Jun. 18, 1971.
CFR, Food and Drugs, 21, Parts 170–199.
Skeist Laboratories, Inc., Water Soluble Polymers III, A multiple client study Nov. 1983.

Primary Examiner—Paul R. Michl
Assistant Examiner—LaVonda DeWitt
Attorney, Agent, or Firm—Robert A. Miller; John G. Premo

[57] ABSTRACT

Glyoxylated vinyl amide polymers in combination with polyols provide improved adhesive coating agents for Yankee Dryers.

6 Claims, No Drawings

WATER SOLUBLE POLYOLS IN COMBINATION WITH GLYOXLATED ACRYLAMIDE/DIALLYLDIMETHYL AMMONIUM CHLORIDE POLYMERS AS YANKEE DRYER ADHESIVE COMPOSITIONS

GENERAL STATEMENT OF THE INVENTION

The invention compromises combinations of glyoxlated vinyl amide polymers and water soluble polyols which are used in the tissue manufacturing process as Yankee dryer coating agents.

BACKGROUND OF THE INVENTION

In the tissue manufacturing process, the paper sheet is dried by means of a steam heated drying cylinder, termed a Yankee. Adhesive materials are used to coat the Yankee surface in order to adhere the wet sheet to the dryer. This improves heat transfer, allowing more efficient drying of the sheet. Most importantly, these adhesives provide the required adhesion to give good creping of the dry sheet. Creping is the process of impacting the sheet into the metal blade, thus compressing the sheet in the machine direction, creating a folded sheet structure. Creping breaks a large number of fiber-to-fiber bonds in the sheet, imparting the qualities of bulk, stretch, absorbency, and softness which are characteristic of tissue. The amount of adhesion provided by the coating adhesive plays a significant role in the development of these tissue properties.

The Yankee coating also serves the purpose of protecting the Yankee and creping blade surfaces from excessive wear. In this role, the coating agents provide improved runability of the tissue machine. As creping blades wear, they must be replaced with new ones. The process of changing blades represents a significant source of tissue machine downtime, or lost production, as creped product cannot be produced when the blade is being changed. Release agents, typically hydrocarbon oils, are used in association with the coating polymers. These agents aid in the uniform release of the tissue web at the creping blades, and also lubricate and protect the blade from excessive wear.

Each tissue mill and even each tissue machine has different Yankee coating requirements. This is caused by differences in furnish, water chemistry, wet end chemical additives, machine conditions, dryness of the sheet to be creped, and degree of creping desired. Due to the differences in coating requirements needed from machine to machine, it is difficult for one coating polymer to perform in an optimal manner on each machine.

It has recently been discovered that a superior adhesive for Yankee Dryers, used to produce creped paper products, comprises glyoxated poly-acrylamide/diallyl-dimethyl ammonium chloride (DADMAC). The use of these resins as creping adhesives is disclosed in the application of Arthur James Begala and Gary S. Furman Jr. for Yankee Dryer Adhesives filed 5/18/90, Ser. No. 525806. The disclosure of this application is incorporated herein by reference. While these resins have provided superior Yankee Dryer adhesives, it would even be more beneficial to the art if they could be improved upon.

OBJECTS OF THE INVENTION

It is an object of this invention to provide Yankee coating compositions which provide increased flexibility to adjust coating properties in order to give good performance under a wide variety of conditions.

It is another object of this invention to provide a means of adjusting the adhesion provided by glyoxylatedpoly(acrylamide/DADMAC) resins. While it is desirable for a creping adhesive to show strong adhesion in order to develop good sheet properties, the adhesion provided by some glyoxylatedpoly(acrylamide/DADMAC) resins is so strong that they cannot be used on all types of tissue machines.

It is the further object of this invention to disclose coating compositions comprised of compatible materials which form uniform films. Typical practice in the industry today involves the use of an adhesive polymer in combination with a release oil. These materials are not compatible and do not form uniform films.

THE INVENTION

The invention comprises a creping adhesive composition for creping cellulosic webs. It comprises:

a) from 5 to 95 weight per-cent on an active polymer basis of a water soluble acrylamide polymer and preferably an acrylamide/DADMAC polymer having sufficient glyoxal-reacted amide substituents and unsubstituted amide groups to be thermosetting. The ratio of the number of glyoxal-reacted amide substituents to the number of unsubstituted amide groups is in excess of 0.06:1 and b) from 5 to 95 per-cent by weight of a water soluble polyol.

THE GLYOXYLATED-ACRYLAMIDE/DADMAC POLYMERS

These polymers are described in detail in U.S. Pat. No. 3,556,932, the disclosure of which is incorporated herein by reference. These polymers are ionic or non-ionic water soluble polyvinyl amides, having sufficient glyoxal substituents to be thermosetting.

As indicated in U.S. Pat. No. 3,556,932 the DADMAC component in the polymers is sufficient to render them substantive to cellulose fibers in aqueous suspensions. The amount of DADMAC groupings in these polymers may vary. It may be less than 10 mole per-cent (e.g. 1–6) or as high as 50 mole per-cent. In a broad aspect of the invention polyacrylamide per se may be used. On a weight basis of the active backbone polymer the glyoxal is reacted in amounts ranging from 1.0 to 30.0 weight per-cent, based on the weight of the polymer. For more specificity as to the respect to minimum amounts of ionic groupings necessary to produce the thermosetting resins, reference should again be made to the disclosure of U.S. Pat. No. 3,556,932.

The most preferred polymer is one that is formed by reacting at a temperature of at least 25° C., and as high as from 50°–100° C., an acrylamide/DADMAC copolymer containing approximately 95 mole per-cent acrylamide and five mole per-cent DADMAC and having a weight average molecular weight of about 10,000 to about 25,000 with glyoxal. The glyoxal is added to the base polymer at a weight ratio, based on actives backbone polymer. This preferred Yankee Dryer adhesive comprises a copolymer of acrylamide and diallyl-dimethyl ammonium chloride containing from about 2.0 to about 10.0 mole per-cent DADMAC and has the molecular weight in the range cited above. The method of producing these glyoxlated polymers also is described in further detail in U.S. Pat. No. 3,556,932.

The preferred polyacrylamide polymers reacted with glyoxal as described generally above has the following characteristics:

This polymer which is used in the Examples hereafter has 5 mole % DADMAC in backbone; 30 weight % of glyoxal based on backbone solids. It is an aqueous solution polymer containing 6.5% active material (polymer and glyoxal). It has a Brookfield viscosity of glyoxylated polymer = 10-15 cps #1 spindle, 60 rpm, Brookfield viscosity of backbone polymer = 360-1720 cps, #2 spindle, 12 rpm.

The above polymer is hereafter referred to as Polymer 1.

THE WATER SOLUBLE POLYOLS

The water soluble polyols used in combination with the glyxoylated acrylamide/DADMAC adhesives may be selected from a wide number of water soluble polyols. They are generally simple polyols which contain not more than six hydroxyl groups. Also, they are of relatively low molecular weight e.g. below about 3,000 and usually below about 2,000.

Illustrative of the water soluble polyols that may be used to prepare the compositions of the invention, are such compounds as glycerine, ethylene glycol, sorbitol, diethyleyne glycol, and triethyleyne glycol. Any water soluble alcohol falling within the generic class described above may be used in combination with glyoxylated acrylamide DAMAC resins to produce improved or plasticized Yankee Dryer Adhesives.

The amount of water soluble polyols in relation to the glyoxylated polyacrylamide DADMAC polymers on a dry polymer basis may range on a weight per-cent basis as indicated from about 5 to 95 % by weight. In a preferred embodiment of the invention it is desirable to use between 10-75% by weight of the water soluble polyol. It is to be understood that not all of the water soluble polyols produce similar results. In certain instances, depending upon the temperature employed, the particular glyoxylated acrylamide DADMAC resin used and other variables, routine experimentation will be necessary to determine the optimum water soluble polyol to be used, as well as the particular amount to be employed in conjunction with the glyoxalated polyacrylamide DADMAC resin.

APPLICATION OF THE COMPOSITIONS TO YANKEE DRYERS

The application of the composition of the invention to Yankee dryers is a three step process comprising:

a) Applying to a rotating creping cylinder a dilute aqueous solution of the composition of the invention;

b) Pressing a cellulosic web against the creping cylinder to effect adhesion of the web to the surface of the cylinder; and c) Dislodging the web from the creping cylinder by contact with a doctor blade.

The compositions of the invention are utilized in the form of dilute aqueous solutions. Preferably, the dilute aqueous admixture of the compositions used to coat the Yankee contains from about 0.05 to about 4 weight per cent solids. Those skilled in the art of creping adhesives will appreciate that the reason for such a large percentage of water in the admixture is in part the need to only deposit a very thin layer of adhesive on the creping cylinder, which is most easily accomplished with, for example, a spray boom.

EVALUATION OF THE INVENTION

Observation of Cast Polymer Films

The relative compatibilities and change in properties of Polymer 1 as plasticizing material are added may be demonstrated by simple observation. Films of the blended materials were cast by transferring aqueous solutions of the blended materials to open plastic petri dishes and allowing the solutions to air dry. Results are shown in Table 1.

TABLE 1

Observations of plasticized glyoxylated poly (AMD/DADMAC) films.

| Plasticizer | % Added* | Film Appearance | Film Flexibility |
|---|---|---|---|
| sorbitol | 10 | cream-colored; opaque | 1 |
|  | 25 | clear; transparent | 2 |
|  | 50 | translucent; slight haze | 3 |
|  | 75 | clear; transparent | 4 |
| glycerol | 10 | translucent; hazy | 2 |
|  | 25 | translucent; hazy; yellowish | 3 |
|  | 50 | translucent; yellowish | 4-5 |
| ethylene glycol | 10 | translucent; hazy | 2 |
|  | 25 | translucent; yellowish | 3-4 |
|  | 50 | translucent; yellow | 5 |
| diethylene glycol | 25 | translucent; hazy; yellowish | 1 |
|  | 50 | translucent; hazy; yellowish | 2 |

*by weight based on polymer solids

The relative film appearance gives an indication of the compatibility of the blended materials. Here, an opaque appearance indicates little to no compatibility, whereas a transparent film indicates good compatibility between the components. Sorbitol evidenced good compatibility with the glyoxylatedpoly(acrylamide/DADMAC) and glycerol, ethylene glycol, and diethylene glycol showed at least partial compatibility.

In comparison, it is interesting to note that the components of a typical coating composition in use commercially today, such as poly(aminoamide)-epichlorohydrin resin plus a hydrocarbon release oil, are not compatible in film form. Upon drying blends of these materials, intact uniform films cannot be obtained. Rather circular areas of oil are found interspersed among areas of polymer. The oil and the polymer are not miscible. The relative uniformity of a Yankee coating is expected to have implications on the uniformity of the creping action and ultimately the uniformity of the final tissue properties.

Relative changes in the physical properties of the films could be determined by subjectively judging the flexibility of the air-dried films. Here flexibility was ranked on a relative scale of 1 thru 5 where 1 = brittle, 2 = slight flexibility, 3 = fair flexibility, 4 = good flexibility, and 5 = excellent flexibility. A film of the glyoxylated-poly(acrylamide/DADMAC) resin by itself may be considered brittle. All the plasticizers acted to increase the flexibility of the polymer film. These observations of relative flexibility are, of course, dependent on the moisture content in the film, as water itself is an excellent plasticizer.

Differential Scanning Calorimetry (DSC) of Dried Polymer Film

This example demonstrates the variation of glyoxylated-poly (acrylamide/DADMAC) glass transition temperature with plasticizer content. The glass transition temperature $T_g$, is characteristic of a particular polymer, and represents the change which occurs in going from the glassy to the rubbery or flexible state. To a large extent, the usefulness of a particular polymer, in regard to its properties, is quite dependent on its glass transition temperature. The influence of $T_g$ on performance should also be expected for Yankee Dryer coating polymers. Therefore, changes in the $T_g$ of the coating polymer can be used to alter polymer performance on the Yankee.

The $T_g$'s are given in Table 2 for the appropriate concentrations of sorbitol.

TABLE 2

| $T_g$'s of glyoxylated-poly (AMD/DADMAC) and sorbitol blends. | |
|---|---|
| Sorbitol (wt %) | $T_g$ (°C.) |
| 70 | 29 |
| 60 | 43 |
| 50 | 53 |
| 40 | 64 |
| 30 | 117 |
| 20 | 133 |

The polymer itself has a $T_g$ typically in the range from 150°–165° C., which can be determined from DSC second run data. In the first run this transition is obscured by an exotherm which may be related to further crosslinking of the polymer. From Table 2, it is quite clear that sorbitol can be used to alter the $T_g$ of the glyoxylated-poly(acrylamide/DADMAC).

Adhesion Testing of Glyoxylated-Poly(Acrylamide/DAMAC Resins with Plasticizers The relative adhesion of creping adhesive compositions was measured by means of a peel test. In the test procedure, a paper sample was attached to a metal panel with the adhesive of interest, and peeled at an angle of 90°. The paper substrate used in the test was a filter grade paper obtained from Filtration Sciences. This paper has a basis weight of 78 g/m². The metal panels, to which the paper was adhered, are standardized test panels produced from low carbon steel and supplied with a smooth finish (surface roughness of 0.2–0.3 um).

In the procedure a 76 um film of the adhesive was uniformly applied to a steel test panel by means of an applicator. The paper test strip was carefully applied to the film and rolled once with a weighted roller to achieve uniform contact between the paper, adhesive, and metal panel. The panel with attached paper strip was then mounted on the peel testing apparatus, the surface of which was controlled to a temperature of 100° C. When the sample was stabilized at this temperature, the paper strip was peeled from the panel and the average force needed to accomplish the separation was recorded. The strip was peeled from the panel at a constant effective speed of 43 cm/min.

Results for three plasticizing materials are shown in Table 3. Table 3. Adhesion results for plasticized glyoxylated-poly (AMD/DADMAC)

| Sample (wt. %)* | Avg. Adhesion (g/in)** | Std. Dev. (g/in) |
|---|---|---|
| Sorbitol | | |
| 0.11 | 87.0 | 4.0 |
| 0.33 | 86.1 | 17.6 |
| 1.00 | 88.9 | 9.5 |
| 1.50 | 72.1 | 23.0 |
| 2.50 | 39.0 | 15.2 |
| 5.00 | 25.8 | 15.2 |
| 10.00 | — | — |
| Glycerol | | |
| 0.50 | 80.6 | 19.6 |
| 1.00 | 57.0 | 19.6 |
| 1.50 | 48.4 | 15.3 |
| 2.50 | 71.6 | 15.6 |
| 5.00 | 86.1 | 17.4 |
| 10.00 | 58.2 | 7.2 |
| 20.00 | 43.5 | 6.1 |
| Ethylene Glycol | | |
| 1.00 | 39.9 | 15.9 |
| 1.50 | 84.9 | 19.7 |
| 2.50 | 107.6 | 17.6 |
| 5.00 | 124.2 | — |
| 10.00 | 46.7 | 11.1 |
| 20.00 | 37.2 | 5.6 |

*all samples contained 1 wt % polymer
**At least 5 tests per condition, except to 5.0 wt % ethylene glycol, where 3 of 5 tests resulted in paper failure.

The polymer by itself shows an adhesion of approximately 89 g/in for a 1 wt % solution. The plasticizers, sorbitol, glycerol, and ethylene glycol, gave no adhesion of the paper to the metal panel. In Table 3 the level of adhesive polymer is kept constant at 1 wt. % while the level of plasticizer is varied. For sorbitol, adhesion remained constant up to a 1:1 ratio of plasticizer to polymer. Thereafter adhesion dropped rapidly until at a 10:1 ratio of plasticizer to polymer, no adhesion remained. Both glycerol and ethylene glycol showed an initial dip in adhesion, followed by a rise to a peak, around a ratio of 5 parts plasticizer, followed again by a gradual decrease in adhesion. These effects were more pronounced with ethylene glycol.

These results demonstrate the ability to alter adhesion by introduction of plasticizers. They also demonstrate the ability to maintain high adhesion properties when significant physical changes to the polymer film have taken place. For example at a 1:1 ratio of polymer to sorbitol, adhesion is maintained at the same level as the polymer alone, but the $T_g$ of the polymer film has been reduced to 53° C. from approximately 150°.

I claim:

1. A creping adhesive composition for creping cellulosic webs comprising:
   a) from 5 to 95 weight per-cent of a water soluble acrylamide polymer having sufficient glyoxal-reacted amide substituents and unsubstituted amide groups to be thermosetting with the ratio of the number of said glyoxal reacted amide substituents to unsubstituted amide groups being in excess of 0.06:1, and,
   b) from 5 to 95 per-cent by weight of water soluble polyol having a MW below 3000.

2. The creping adhesive composition for creping cellulosic webs of claim 1 where a) is an acrylamide/diallyldimethyl ammonium chloride polymer.

3. The creping adhesive composition of claim 2 where the water soluble polyol is from the group consisting of sorbitol, glycerol, ethylene glycol, and diethylene glycol and the polymer contains from 1–30 weight per-cent of glyoxal based on the weight of the acrylamide-diallydimethyl ammonium chloride polymer.

4. A method for creping cellulosic webs comprising:

a) applying to a rotating creping cylinder a dilute aqueous solution of a composition comprising:
   1) from 5 to 95 weight per-cent of a water soluble acrylamide polymer having sufficient glyoxal-reacted amide substituents and unsubstituted amide groups to be thermosetting with the ratio of the number of said glyoxal reacted amide substituents to unsubstituted amide groups being in excess of 0.06:1 and,
   2) from 5 to 95 per-cent by weight of water soluble polyol having a molecular weight below 3000.

b) pressing of a cellulosic web against the creping cylinder to effect adhesion of the web to the surface of the cylinder; and c) dislodging the web from the creping cylinder by contact with a doctor blade.

5. The method of claim 4 where 1) is an acrylamide/-dialyldimethyl ammonium chloride polymer.

6. The method of claim 4 where 2) is from the group consisting of sorbitol, glycerol, ethylene glycol, and diethylene glycol and the polymer contains from 1-30 weight per-cent of glyoxal based on the weight of the acrylamide-diallydimethyl ammonium chloride polymer.

* * * * *